Figure 1:
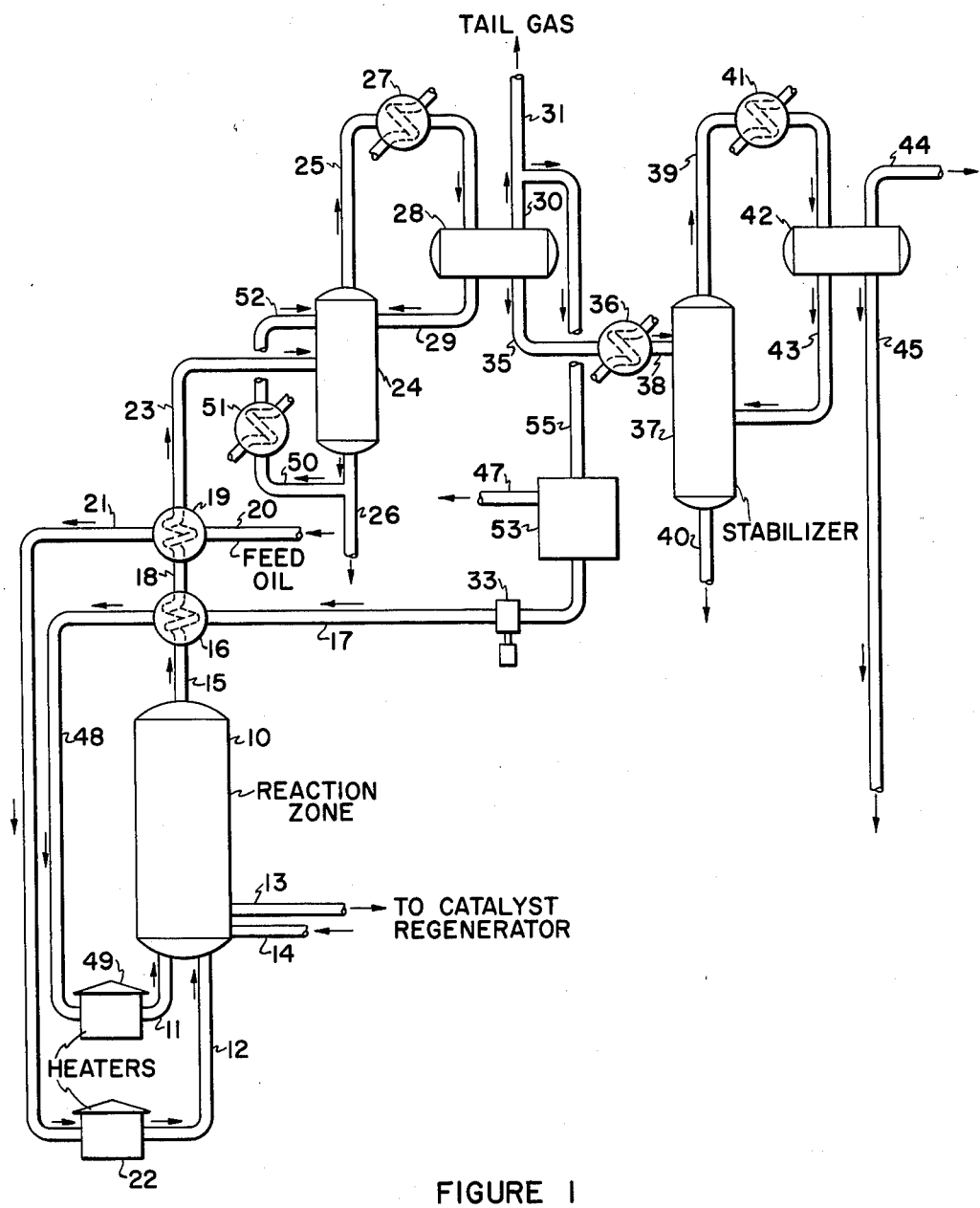

Oct. 19, 1965 C. W. SKARSTROM ETAL 3,212,236
PROCESS FOR THE RECOVERY OF HYDROGEN FROM
A METHANE-HYDROGEN GAS STREAM
Filed April 20, 1960 3 Sheets-Sheet 2

Charles W. Skarstrom
Gerald E. Phillips    Inventors
By W.O. Heilman
            Patent Attorney

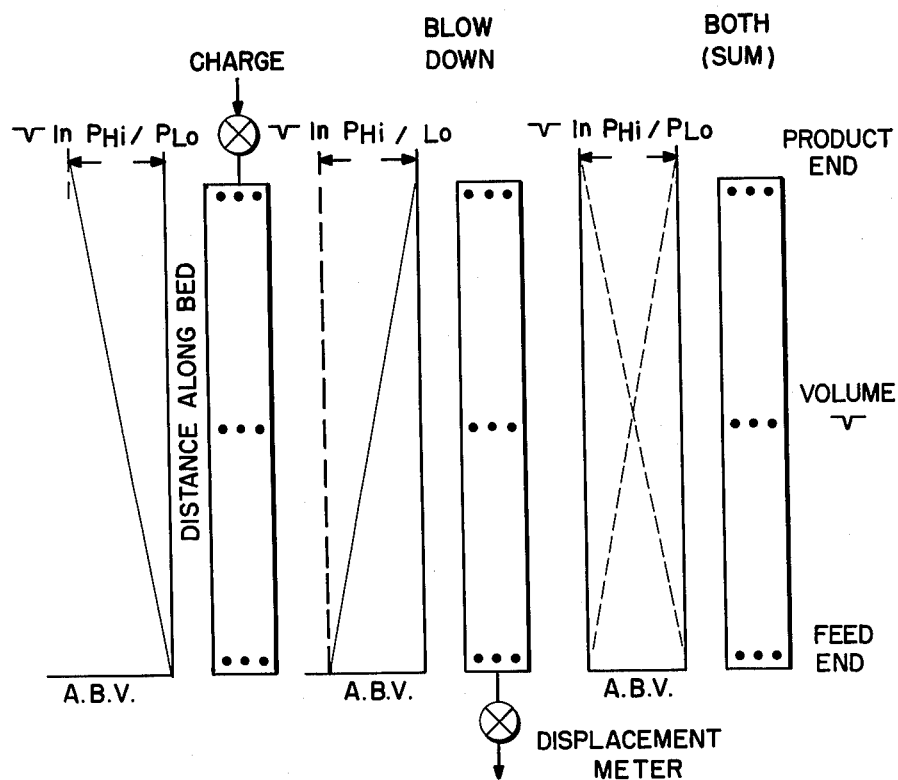

United States Patent Office 3,212,236
Patented Oct. 19, 1965

3,212,236
PROCESS FOR THE RECOVERY OF HYDROGEN FROM A METHANE-HYDROGEN GAS STREAM
Charles W. Skarstrom, Montvale, and Gerald E. Phillips, Cranford, N.J., assignors to Esso Research and Engineering Company, a corporation of Delaware
Filed Apr. 20, 1960, Ser. No. 23,492
The portion of the term of the patent subsequent to Sept. 17, 1980, has been disclaimed
6 Claims. (Cl. 55—58)

The present invention is concerned with an economic and improved method for the recovery of a desired component from gas streams containing the same. The present invention is a variation of the method and apparatus for fractionating gaseous mixtures described in copending application Serial No. 714,780, filed February 12, 1958, now Patent No. 2,944,627, entitled "Method and Apparatus for Fractionating Gaseous Mixtures," inventor Charles W. Skarstrom. In application Serial No. 714,780 no external heat is transferred to the system for the regeneration of the beds. In essence the beds are backwashed at low pressure with a portion of the product. In accordance with the process of the present invention the specific backwash flow stream is not utilized. Also in accordance with the present invention the step of repressuring the beds with the product from the product end is carried out in combination with blow down from the feed end which provides a backwashing action sufficient to effectively regenerate the beds.

The present invention is particularly adapted for use in certain separations as for the recovery of hydrogen from gas streams containing hydrogen. A very desirable adaptation of the present invention is recovery of hydrogen from hydrocarbon gas streams containing the same. A very specific adaptation of the present invention comprises its utilization in a hydroforming process in order to improve the hydroforming operation. In essence this specific adaptation of the present invention comprises a process wherein the tail gases recycled to the reaction zone are pressure cycled, wherein in one zone the hydrogen is purified at a relatively high pressure while desorption is conducted at a relatively low pressure.

Catalytic reforming has assumed increasing importance in petroleum refining as a result of the desire to upgrade the octane number of petroleum hydrocarbons. There are many catalytic reforming processes known in the art. Basically they may be divided into those employing a precious metal catalyst, as for example, platinum on alumina or other suitable base, or non-precious metal catalysts, such as, molybdena, cobalt-molybdena, and the like. In general, any hydrocarbon boiling in the range of about 100 to 430° F. may be reformed at a reaction temperature range of about 800 to 1000° F. The reforming process is actually a combination of several types of chemical reactions, such as, aromatization, dehydrogenation of naphthenes, isomerization, and the like. The most desired reaction product is the $C_5+$ fraction which is readily employed as a high octane gasoline component.

More specifically, hydroforming is a process in which the normally liquid feed stock boils substantially within the range of from about 150° to 430° F. and more particularly 180° to 350° F. The light ends, i.e., the material boiling from 0° to 180° F., are not ordinarily subjected to this reaction, for the reason that the virgin naphtha light ends are not appreciably upgraded by conventional reforming treatments. The feed or charging stock to the hydroforming reactor can be a virgin naphtha, a cracked naphtha, a coker naphtha, a Fischer-Tropsch naphtha, a mixture of these, or the like.

Hydroforming operations are ordinarily carried out in the presence of hydrogen or hydrogen-rich recycle gas at temperatures of 750° to 1150° F. in a pressure range of about 50 to 1000 pounds per square inch, and in contact with solid catalysts.

As mentioned, the chemical reactions involved in the hydroforming process include dehydrogenation of naphthenes to the corresponding aromatics, isomerization of straight chain paraffins to form branched chain paraffins, isomerization of cyclic compounds, such as, ethylcyclopentane, to form methylcyclohexane, and some aromatization of paraffins, dealkylation and hydrocracking of paraffins. In a hydroforming operation which is conducted efficiently it is possible with the use of a proper catalyst and proper conditions of operation to hydroform a virgin naphtha to a hydroformate, for example, having Research Clear Octane Number of from 95 to 98 and obtain yields of $C_5+$ hydrocarbons as high as 80%.

Catalysts used in hydroforming are platinum, palladium, molybdenum oxide, chromium oxide, cobalt molybdate or, in general, oxides or sulfides of metals of groups IV–VIII of the periodic system of elements or mixtures of these elements supported or dispersed upon a base or spacing element, such as, alumina gel, precipitated alumina, or zinc aluminate spinel.

A particularly useful catalyst for hydroforming operations is .001–2.0 weight percent platinum upon an alumina spacing agent or base.

In hydroforming operations hydrogen containing recycle and make gas is recycled with the feed in order to minimize coke deposition and to supply heat for the hydroforming reactions. When, as is conventionally done, platinum catalyst is extensively chlorine treated during the retactivation process, chlorine is subsequently stripped off the catalyst in the hydroforming process and is recycled with the recycle gas. Or where chlorides come in with the feed, they build up on the catalyst and are subsequently stripped off the catalyst and build up in the recycle gas.

A typical fluid hydroforming process is illustrated in FIGURE 1. Turning to FIGURE 1, shown therein for the purposes of illustration is a fluid hydroforming reaction system, although as previously noted the present invention is not limited thereto. The hydroforming reaction is carried out in zone 10 in the presence of hydrogen-rich recycle gas and a standard hydroforming catalyst such as molybdenum oxide upon an alumina support, or in general oxides or sulfides of groups IV, V, VI, VII and VIII of the periodic table based on a suitable support.

The catalyst is maintained in the form of a fluidized bed at a temperature of 750–1150° F., e.g., 950° F., and a pressure of 150 to 600 p.s.i.g., e.g. 200 p.s.i.g. Requisite temperature level is maintained by preheating the feed, circulating hot catalyst and employing heated recycle gas.

As is conventional in fluid hydroforming, a portion of the catalyst may be withdrawn by line 13, regenerated in a regenerator in the presence of oxygen, and returned to reaction zone 10 by line 14 at a temperature of 1050 to 1150° F. The feed, a virgin naphtha boiling between about 100 to 430° F., is introduced into the system by line 20, preferably thereafter being heat exchanged with the reaction products in heat exchanger 19. The preheated oil is then passed by line 21 to heater 22 wherein it is vaporized, the vaporized charge being introduced into the reaction zone by line 12 at a temperature of 950° F.

Concurrently, a hydrogen-rich recycle gas derived in manner described below is heated in heater 49 to a temperature of about 1200° F. and injected into the reaction zone through inlet 1.

The feed hydrocarbons upon contact with the turbulent catalyst mass are converted principally into reaction products of essentially the same boiling point as the feed stock, together with a substantial proportion of hydrogen. The reaction products may be subjected to solid de-entrainment by means not shown prior to being withdrawn overhead by line 15. They preferably are cooled in heat exchangers 16 and 19, connected by line 18, by giving up their heat to the recycle gas and feed oil, respectively. The products are then passed by line 23 to scrubber 24 wherein a relatively cool heavy oil introduced by line 52 passes countercurrently downwards to the gasiform products, condensing heavy ends which may be rejected by outlet 26. The scrubbing medium is preferably derived from the heavy reaction products, the heavy oil being recycled by line 50 through cooler 51 and back to the scrubbing zone.

The uncondensed material is withdrawn by line 25, further cooled in unit 27 and passed into separation drum 28. Sufficient cooling is effected in cooler 27 so that separator 28 normally operates at temperature below 120° F., e.g., 105° F. at 185 p.s.i.g. The vast majority of the hydrocarbons are thus condensed. A portion thereof may be recycled to unit 24 by line 29, while the remainder of the condensed hydrocarbon products are passed to stabilizer 37 by lines 35 and 38 after being heated in unit 36 to a temperature of 100 to 300° F.

The uncondensed reaction effluent, termed tail gas, is withdrawn from separator 28 through outlet 30. The tail gas comprises principally hydrogen, e.g., 72.5 volume percent, along with minor amounts of light hydrocarbons principally in the $C_1$ to $C_4$ range. The $C_1$ to $C_4$ hydrocarbons normally will comprise less than 50 volume percent of the tail gas. It is desirable to have as little as possible $C_5+$ in the recycled tail gas. The temperature of the tail gas may be about 150° F. to 250° F. or as low as 50° F.

A portion of the tail gas may be withdrawn from the system by line 31, while the remainder of the tail gas is employed as recycle gas. The recycle gas fraction is passed by line 55 to compressor 33 wherein its pressure is brought up to about 50 to 100 pounds above reaction pressure.

The bulk of the hydrocarbon products is fed to stabilizer 37 wherein they may be subjected to rectification to separate the various product fractions. Thus, the $C_5+$ hydrocarbon, the most valuable product, may be recovered by line 40 for use as high octane gasoline, while the lighter hydrocarbons are taken overhead by line 39, cooled in cooler 41 and separated in unit 42 into a $C_2$ and lighter fraction and a condensed $C_3$ to $C_4$ fraction. A portion of the condensed hydrocarbons may be recycled to stabilizer 37 by line 43, while the $C_2$ and lighter fraction is withdrawn by outlet 44. The $C_3/C_4$ fraction removed by line 45 may be partially recovered through line 46.

In accordance with the specific adaptation of the present invention the recycle tail gas removed by means of line 55 is passed through zone 53 by means of lines 55 and 17. This particular apparatus utilized will be more specifically hereinafter described. In essence, the operation comprises the preparation of a substantially pure hydrogen stream or a more rich hydrogen stream which is passed to compressor 33. Non-hydrogen constituents are removed by means of line 47 and may be further treated or disposed of as desired. It is also within the concept of the present invention to position zone 53, intermediate compressor 33, and the reaction zone 10.

Figures 2, 3:
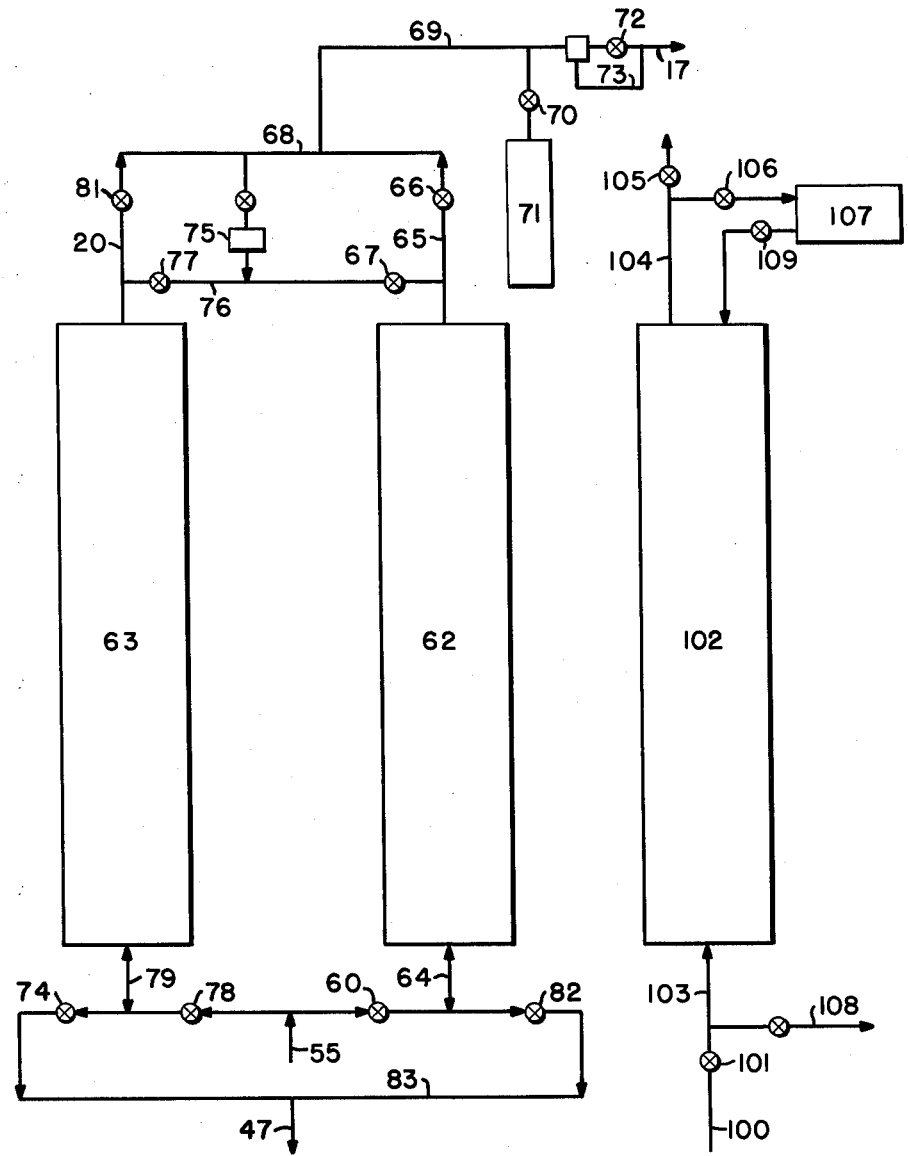

One specific method of operating zone 53 as shown on FIGURE 1 is illustrated in detail in FIGURE 2. Referring specifically to FIGURE 2, the feed or tail gas is introduced into zone 53 by means of line 55. This feed passes through an open solenoid operated valve 60 and is then introduced into the bottom of zone 62 by means of line 64. Both zones 62 and 63 are packed with activated carbon. Substantially pure hydrogen is removed from the top of zone 62 by means of line 65. The hydrogen flows through check valve 66 and cannot pass through valve 67. A portion of the hydrogen passing through line 69 passes through valve 70 and is introduced into a product surge tank 71. The remainder of the hydrogen in line 69 passes through a rate of flow valve 72, the rate of which is adjusted by a flow controller 73 which maintains predetermined pressure differential across the valve. Product hydrogen is passed by means of line 17 to the reaction zone as hereinbefore described with respect to FIGURE 1.

During the adsorption cycle a concentration gradient moves upwardly through bed 62. In accordance with preferred adaptation product surge tank 71 becomes full of product hydrogen at the pressure existing in bed 62. At this point valve 74 closes and valve 75 opens permitting backflow of product hydrogen from bed 62 and from the surge tank 71 through line 68, through valve 75, line 76 and valve 77 into the top of zone 63. These valves are maintained open until zone 63 attains the desired predetermined high pressure for adsorption.

At this point valve 60 closes and valve 78 opens permitting flow of feed through valve 78 and into the lower end of zone 63 by means of line 79. Product hydrogen is removed overhead from zone 63 through check valve 81 then through lines 68 and 69 in a manner as described with respect to zone 62. Simultaneously with the closing of valve 60, valve 82 opens permitting zone 62 to backflow and to attain the predetermined desired low pressure. Adsorbed constituents in zone 62 are desorbed at the lower pressure from the adsorbent and removed by means of line 64 through valve 82 and lines 83 and 47 and are further handled or refined as desired.

As the adsorption in zone 63 continues a concentration gradient of adsorbed constituents moves upwardly through zone 63. Prior to breakthrough and at a predetermined time of cycle valve 82 closes and valve 75 opens thereby permitting backflow of hydrogen from the surge tank and from zone 63 into the top of zone 62. This backflow is continued until the pressure within zone 62 attains the predesired relatively high adsorption pressure. The cycle is thus continued.

The operation may be continued intermittently as illustrated in FIGURE 3 which will be described with respect to the removal of hydrogen from hydrocarbon gases comprising methane, ethane and the like. The feed gas is introduced into the system by means of line 100 passing through open valve 101 and into the bottom of zone 102 by means of line 103. Hydrogen is removed overhead from zone 102 by means of line 104 a portion of which may be passed through open valve 105 as product hydrogen. A portion of the hydrogen flows through valve 106 and is stored at high pressure in surge tank 107.

At a predetermined time and prior to breakthrough valves 105 and 106 are closed along with valve 101. Valve 108 is opened permitting adsorbed constituents in zone 102 to be desorbed at the lower pressure and be removed from the system by means of line 103 through valve 110 and line 108. After the system has attained the predetermined low pressure valve 110 is closed and valve 109 opens thus permitting product hydrogen to backflow through valve 109 and line 111 into the top of zone 102. The backflow could, of course, be accomplished through valve 106 and line 104. After zone 102 has attained the desired relatively high adsorption pressure valve 109 is closed, valve 101 opened along with valves 105 and 106 and the cycle is continued.

In essence, the apparatus described in FIGURE 2 comprises two adsorbent beds which are alternately connected to the high pressure feed. While one bed is at high pressure the other bed is dumped to the low pressure and then at the low pressure backwashed with some of the high purity product $H_2$ through a flow control valve and brought back up to line pressure with pure $H_2$ product at the product end. Five 2-way electric solenoid valves are used.

With respect to FIGURE 2 it has also been found that the repressuring downward with the pure product gas has two desirable features; namely, mechanical and process, as follows: (1) Mechanical. Inrushing gases from above tend to keep the bed of particles well packed. This makes movement with consequent attrition of the particles negligible. (2) Process improvement. Repressuring with pure product gas instead of feed eliminates the very fast inflow of feed. When repressuring with feed, the high space velocity of the incoming gas causes the fronts of the adsorbing components to be moved an excessive amount toward the product end. By recharging with product from the other bed which is at high pressure, the increased feed space velocity to provide this extra demand for $H_2$ is kept at a minimum. It is further minimized by a product surge tank, hereinafter described.

Another desirable feature of the apparatus and process of FIGURE 2 is the product surge tank 64. A surge tank used in the pure $H_2$ product line markedly increased the $H_2$ recovered from the feed. Without the tank, $H_2$ recovery from a 50–50 $H_2$—$CH_4$ mixture was 59%. With it the recovery increased to 70%. The volume of the surge tank was about five times the volume of one bed. Its main function is to spread the demand for recharge product $H_2$ over the full adsorption cycle. This reduces the feed space velocity through the on stream bed during the repressuring. The product surge tank markedly improves the separating efficiency of this process to make pure $H_2$ and $H_2$-hydrocarbon mixtures.

The high purity hydrogen derived from the instant process may be utilized for drying in the regeneration of the aforementioned platinum catalysts. For example, these catalysts are regenerated by initial treatment with an inert gas comprising 2–3% oxygen. Subsequently, the catalyst is treated with chlorine to make up for the chlorine stripped off during the hydroforming reaction. To complete the regeneration, it is desirable to dry the catalyst with high purity hydrogen, since water is detrimental to the hydroforming process.

Broadly the process is concerned with the fractionation of a gaseous mixture utilizing the technique as described in Serial No. 714,780 copending herewith except no backwash is used until zone is to be repressured. The zones may be packed with any type of suitable adsorbent having a preferential selectivity for the components to be removed from the gaseous stream. Suitable adsorbents are, for example, activated carbon, activated aluminum, molecular sieves and other solid adsorbents. Suitable molecular sieves are 4A, 5A, 13A and the like.

As pointed out heretofore the specific concept of the present invention is to first dump the bed to be desorbed in a direction countercurrent to the feed stream on adsorption. The bed is then brought up to the relatively high adsorption pressure utilizing the product and introducing this product in a direction countercurrent to the flow of the feed and concurrent with the flow of the dump. Summarizing the particular feature of the present operation lies in the technique by which the beds are regenerated. This technique comprises the following: (1) by arranging the charge and the dump flows both to be in the same direction, which is opposite to the feed flow through the beds, (2) by using product gas to charge the beds, and (3) by switching the beds before the actual volume of feed flow exceeds the effective back purge volume of flow produced by the above.

The amount of regeneration (and hence separation) afforded by each charge-dump cycle can be determined in each specific case. A possible explanation for its magnitude is as follows. Heretofore in processes described in 714,780 a specific backflow of product at low pressure was needed to regenerate the beds. The actual volume of this product backflow had to exceed the actual volume of feed flow during the adsorption cycle. In this way the gradient of adsorbed components was moved back toward the feed end during regeneration the same distance it moved forward toward the product end during adsorption. With sufficiently long beds, complete removal of more strongly adsorbed components was possible in the product stream. The novel regeneration technique of this present invention accomplishes the same thing.

Also heretofore, the adsorption beds were charged up to the high pressure with feed mixture at the feed ends. The beds were dumped from the same feed end. Charging with feed and dumping from the same ends has always given little or no separation when the product back purge was zero.* Thus, the charging and dumping steps were believed to contribute little to the separating process. In the present invention, the charging and dumping of the beds have been combined in a way to have a desirable separating effect.

The following theory is believed to be correct in principle. Consider an empty container of volume V, the same size and shape as an adsorption bed. Let one end be called the product end, the other is called the feed end. Let this container V be charged at the product end with gas pressure from a low pressure, $P_{Low}$ to a high pressure $P_{High}$. The actual volume of gas going in can be computed. This is the volume which would be measured by a displacement meter (independent of pressure) inserted in the pipe at the entrance at the product end.

If the charging is done at constant temperature with an ideal gas, the actual gas volume passing into product entrance end is computed as follows:

The ideal gas law tells the weight of gas, $m$ (of molecular weight M) in a container of volume, V, at an absolute pressure, $p$, and absolute temperature, T:

$$pV = mRT/M \tag{1}$$

If some more gas $dm$ is put in the container the pressure will rise by an amount $dp$ $$(p+dp)V = (m+dm)RT/M \tag{2}$$

Subtracting (1) from (2) gives the incremental pressure rise $dp$ for the addition of gas $dm$ $$Vdp = dmRT/M \tag{3}$$

The volume of the small amount of gas $dm$ is $dv$ measured at the pressure $p$. The amount of this small volume is found by substituting $dv$ for V and $dm$ for $m$ in equation 1. Thus, $$pdv = dmRT/M \tag{4}$$

where $p$ is the continually changing pressure at which $dv$ is put into the container. $dv$ is the actual volume of each incremental $dm$ put into V. Since the right hand members of (3) and (4) are identical, they can be combined as $$Vdp = pdv \tag{5}$$

and rearranged to $$dv = Vdp/p \tag{6}$$

To find the total inwash volume flow passing into V through the product end to raise the pressure from $P_{Low}$ to $P_{High}$ integrate (6):

Actual inwash volume $= \int dv = V \int dp/p$
$= V \ln P_{High}/P_{Low}$ (ln=natural logarithm to the base "e")

Equation 7 gives the actual volume passing into the bed at the product end during a charge. A cross section of particles here would experience this much downward volumetric breeze. A cross section of particles halfway down the bed would feel ½ as much. At the feed end of the bed, now a dead end, no downward washing action occurs. This is shown in FIGURE 4. The actual backwash volume (A.B.V.) felt by a cross section of particles at different distances along the bed is plotted.

---
\* Notable exceptions to this are:
(1) Concentration of $N_2$ from air over 4A sieves. Likewise, methane from $H_2$–$CH_4$ mixtures.
(2) Separations produced where there is time delay in the rate of rise of pressure along the length of the beds achieved, (a) by dense bed packing for lots of flow resistance, (b) by dividing the beds into sections and charging and dumping them in series sequence, and (c) separations produced by inserting a side surge volume at the product end of each bed, connected to it by a flow constriction to delay the pressure rise and fall in the surge volume.

During the blowdown from the feed end the analysis is similar. A cross section of particles at the feed end feels a volumetric downward breeze given by Equation 7. Particles at the product end, now a dead end, feel stagnant gas. Distribution of A.B.V. along the bed is shown in FIGURE 4 for blowdown.

For a complete cycle of charge at the product end and blowdown at the feed end, any cross section of the bed experiences the sum, an actual backwash volume equal to $V \ln P_{High}/P_{Low}$, as given by Equation 7, and as shown in FIGURE 4.

As numerical examples, if the pressure ratios $P_{High}/P_{Low}$ are 2, 10 or 100, then the actual backwash volumes per cycle are 0.69 V, 2.3 V or 4.6 V respectively. Thus the actual volumes of feed put through the bed per cycle must not exceed these quantities at the different pressure ratios. At low pressure ratios this regeneration technique is feeble. It should be augmented with a metered product backflow. At high pressure ratios and with difficult separations, where bed capacity is low for the components to be rejected, this novel regeneration technique can be sufficient for complete rejection of more strongly adsorbed feed components.

In this elementary theory (Equation 7) the bed volume was assumed to be the geometric volume of the adsorbent container. Measurements should be made with the product gas and the actual adsorbent bed to find the effective volume. If the product gas is itself adsorbed, the effective volume may be slightly larger to many times greater than the geometric volume. This could enhance the effectiveness of this novel regeneration technique. For $H_2$ the effective volume was 1.25× (time) the actual bed volume, constant up to 300 p.s.i.g. At 300 p.s.i.g., the same bed exhibited for methane an effective volume of 4×, at 100 p.s.i.g. it was 7×, while at 0 p.s.i.g. it was 18.5×.

Data show that the novel regeneration technique (called no purge) can be used to obtain high purity $H_2$ (99.9+%) from a 50-50 mol percent $H_2$-$CH_4$ feed over activated carbon. Product $H_2$ purity was determined by thermal conductivity comparison with 99.9+% $H_2$. The purities were identical.

Table 1 compares the operation of a two bed activated carbon adsorption apparatus using no purge with operation as a heatless fractionator using the theoretical metered product purge. The comparison favors the no purge operation, showing 15% more $H_2$ product at higher recovery. In both operations, the production of $H_2$ was close to a maximum at the high purity. Increased product take off/cycle caused a slight amount of methane to appear in the product. Production of any high purity $H_2$ in the no purge operation was completely unexpected.

What is claimed is:
1. A method for fractionating a gaseous mixture comprising flowing a feed stream of said mixture consisting essentially of hydrogen and methane at a selected initial relatively high pressure into one end and through a confined adsorption zone into contact with an adsorbent material selective for methane, progressively adsorbing methane from said mixture stream in said zone, whereby an increasing concentration gradient of methane on said adsorbent will advance in the direction of flow, discharging hydrogen from the other end of said zone, under substantially the initial pressure thereof, thereafter stopping the flow of said feed stream, and desorbing said adsorbent solely by reducing the pressure at said one end to a secondary relatively low pressure and withdrawing a gas stream from said one end under said low pressure, thereby progressively desorbing methane from said adsorbent and backflowing methane toward said one end, whereby a decreasing concentration of methane on said adsorbent will advance in the direction of backflow, and discharging methane from said zone at said one end at which feed stream was introduced, thereafter raising the pressure in said zone to said initial pressure thereof by the introduction of at least a portion of said hydrogen at said other end conducting said operation for time periods so that the heats of adsorption and desorption are substantially balanced within said zone, and conducting the fractionation in a manner that substantially the sole transfer of heat to and from the gas in said zone occur in said bed thereby eliminating the transfer of heat externally with respect to said zone, and conducting the fractionation under conditions whereby an oscillating concentration gradient of methane will remain in said zone during both the adsorption and desorption cycle with no purge of said methane from said zone through said one end where the feed stream enters, and said gradient will have a front of lowest concentration intermediate the ends of said zone.

2. A process for the removal of a key component from a gaseous mixture stream utilizing two adsorbent beds each of which is characterized by having a one end and another end, said process comprising the steps of flowing a feed stream of a gaseous mixture consisting essentially of a mixture of hydrogen and methane from one end to the other end through a first bed of an adsorbent initially relatively free of methane at a preselected initial relatively high pressure and in a positive flow direction in an initial cycle, said adsorbent being preferentially selective for methane; discharging hydrogen from said first bed as a primary effluent; segregating a portion of said primary effluent as a product stream and withdrawing the same; passing the remainder of said hydrogen to a storage zone,

*Table 1*

| Feed, mol percent $H_2$ in $CH_4$, 155 p.s.i.g. | Cycle time at high or low press., sec. | Feed, s.c.f./cy. | Dump and purge, s.c.f./cy. | Atmos. purge, s.c.f./cy. | Actual Purge v./v. / Feed v./v. | = Dynamic ratio | 99.9+% $H_2$ product | | | Remarks |
|---|---|---|---|---|---|---|---|---|---|---|
| | | | | | | | s.c.f./cy. | Std. v./v./cy. | Recovery | |
| 50 | 40 | 1.22 | 0.86 | 0.10 | 1.8/2.0 | 0.90 | 0.36 | 6.5 | 59 | On 5A. sieve,[1] 50° F. |
| 50 | 40 | 1.21 | 0.83 | 0.11 | 2.2/2.1 | 1.04 | 0.38 | 7.6 | 63 | On fresh 6G carbon,[2] 42° F. |
| 50 | 40 | 1.31 | 0.87 | 0.00 | 0/2.3 | 0.00 | 0.44 | 8.7 | 67 | With surge tank no purge,[2] 53° F. |
| 25 | 40 | 0.99 | 0.86 | 0.20 | 4.0/1.7 | 2.35 | 0.13 | 2.6 | 53 | 37° F.[2] |
| 50 | 120 | 1.90 | 1.12 | 0 | (2.44+0)/3.28 | [4]0.74 | 0.78 | 15.5 | 82 | 68° F.[2,3] |
| 75 | 120 | 1.85 | 0.73 | 0 | (2.44+0)/3.20 | [4]0.76 | 1.12 | 22.2 | 81 | 75° F.[2,3] |
| 75 | 120 | 2.34 | 1.02 | 0.075 | (2.44+1.49)/4.05 | [4]0.97 | 1.32 | 26.2 | 75 | 73° F.[2,3] |

[1] Bed volumes: 0.055 c.f. each. 5A. sieves, 10-20 mesh.
[2] Bed volumes: 0.0504 c.f. each. 6G activated carbon, 8-14 mesh.
[3] In all these runs, repressuring with product was slowed to 20%×120=24 seconds for this step (20% timer cam overlap). In previous runs cam overlap was 10%. Use of a product surge drum (0.26 c.f.) showed no improvement.
[4] Includes a term in $P_{High}/P_{Low}$=2.44, the contribution to the back purge produced by repressuring beds with product gas (pure $H_2$).

and desorbing said adsorbent reducing the pressure to a relatively low pressure in said second bed of adsorbent at one end which adsorbent is relatively saturated with said key component as compared to said first bed at the start of said initial cycle, whereby as said initial cycle continues under said low pressure, said first bed becomes relatively saturated with methane progressively from said one end toward said other end, and whereby said second bed becomes relatively freed from methane from said other end toward said one end; continuing said initial cycle for a time period less than that required to secure saturation of said first bed at said other end and that required to secure fredom from methane of said second bed at said one end; thereafter raising the pressure to said initial high pressure on said second bed by the introduction of hydrogen from said storage zone at said other end and thereafter introducing said feed stream into said one end of said second bed in positive flow direction at said initial relatively high pressure; discharging hydrogen from said other end of said second bed as a primary effluent; segregating a portion of said hydrogen as a product stream and withdrawing the same; passing the remainder of said hydrogen to a storage zone and thereafter cyclically continuing the operation with no purge of the hydrogen from the one end where the feed stream enters each of the beds during the entire operation.

3. A process for the separation of a gas comprising hydrogen from a gaseous mixture stream comprising hydrocarbons, consisting essentially of a mixture of hydrogen and methane utilizing two adsorbent beds each of which is characterized by having a one end and another end, said process comprising the steps of flowing a feed stream of said mixture from one end to the other end through a first bed of an adsorbent initially relatively free of methane at a preselected initial relatively high pressure and in a positive flow direction in an initial cycle, said adsorbent being preferentially selective for methane; discharging a gaseous stream comprising hydrogen from said first bed as a primary effluent; segregating a portion of said primary effluent as a product stream and withdrawing the same; desorbing a second bed containing adsorbent which is relatively saturated with methane as compared to said first bed at the start of said initial cycle solely by reducing the pressure on said second bed, whereby as said initial cycle continues, said first bed becomes relatively saturated with methane progressively from said one end toward said other end, and whereby said second bed becomes relatively freed from methane from said other end toward said one end; continuing said initial cycle for a time period less than that required to secure saturation of said first bed at said other end and that required to secure freedom from methane of said second bed at said one end; thereafter raising the pressure on said second bed to said initial high pressure by the introduction of said primary effluent at said other end; reducing the pressure on said first bed to said relatively low pressure by reducing the pressure at said one end; thereafter introducing said feed stream into said one end of said second bed in positive flow direction at said initial relatively high pressure; discharging hydrogen from said other end of said second bed as a primary effluent; segregating a portion of said last named primary effluent as a product stream and withdrawing the same; and thereafter cyclically continuing the operation with no purge during the entire operation of the primary effluent from the beds through the one end where the feed stream enters each bed.

4. Process as defined by claim 3 wherein said adsorbent comprises activated carbon.

5. Process as defined by claim 3 wherein said adsorbent comprises activated alumina.

6. Process as defined by claim 3 wherein the remainder of said primary effluent is segregated in a storage zone and wherein said remainder is utilized to repressure said second zone at said other end.

References Cited by the Examiner
UNITED STATES PATENTS

| | | | |
|---|---|---|---|
| 2,818,455 | 12/57 | Ballard et al. | 260—676 |
| 2,850,549 | 9/58 | Ray | 260—677 |
| 2,882,243 | 4/59 | Milton | 252—455 |
| 2,906,795 | 9/59 | Ballard et al. | 260—683.43 |
| 2,914,465 | 11/59 | Hengstebeck | 208—140 |
| 2,944,627 | 7/60 | Skarstrom | 183—114.2 |
| 3,085,972 | 4/63 | Krane et al. | 208—138 |
| 3,104,162 | 9/63 | Skarstrom | 55—58 |
| 3,138,439 | 6/64 | Skarstrom | 55—33 |

ALPHONSO D. SULLIVAN, *Primary Examiner.*

ALLAN M. BOETTCHER, *Examiner.*